United States Patent
Walle et al.

(10) Patent No.: US 8,291,943 B2
(45) Date of Patent: Oct. 23, 2012

(54) EXHAUST-GAS CONDUCTION COMPONENT

(75) Inventors: Bernard Walle, Hemmingen (DE); Michael Pluschke, Neuenbürg (DE)

(73) Assignee: Witzenmann GmbH, Pforzheim (DE)

( * ) Notice: Subject to any disclaimer, the term of this patent is extended or adjusted under 35 U.S.C. 154(b) by 131 days.

(21) Appl. No.: 12/741,096

(22) PCT Filed: Oct. 11, 2008 (Under 37 CFR 1.47)

(86) PCT No.: PCT/EP2008/008614
§ 371 (c)(1), (2), (4) Date: Aug. 30, 2010

(87) PCT Pub. No.: WO2009/056213
PCT Pub. Date: May 7, 2009

(65) Prior Publication Data
US 2011/0056582 A1      Mar. 10, 2011

(30) Foreign Application Priority Data
Nov. 2, 2007   (DE) .................. 10 2007 052 243

(51) Int. Cl.
*F16L 11/00* (2006.01)
(52) U.S. Cl. ......... 138/121; 138/122; 138/114; 138/148
(58) Field of Classification Search .............. 138/114, 138/121, 118, 148, 122
See application file for complete search history.

(56) References Cited

U.S. PATENT DOCUMENTS

| | | | | |
|---|---|---|---|---|
| 2,898,941 A | * | 8/1959 | Kilcup | 138/121 |
| 2,934,095 A | * | 4/1960 | Lockhart | 138/121 |
| 3,773,087 A | * | 11/1973 | Katayama | 138/120 |
| 3,819,849 A | * | 6/1974 | Baker | 174/86 |
| 5,390,494 A | * | 2/1995 | Clegg | 60/299 |
| 5,476,080 A | * | 12/1995 | Brunnhofer | 123/468 |
| 5,506,376 A | * | 4/1996 | Godel | 181/208 |
| 6,062,266 A | * | 5/2000 | Burkhardt | 138/114 |
| 6,216,745 B1 | * | 4/2001 | Augustynowicz et al. | 138/149 |
| 6,446,661 B2 | * | 9/2002 | Armenia et al. | 137/312 |

FOREIGN PATENT DOCUMENTS

| | | |
|---|---|---|
| DE | 3544712 | 6/1987 |
| DE | 19604367 | 8/1987 |
| DE | 4318343 | 12/1994 |
| DE | 19722603 | 8/1998 |
| EP | 0441625 | 8/1991 |
| EP | 789137 A2 * | 8/1997 |

* cited by examiner

*Primary Examiner* — Patrick F Brinson
(74) *Attorney, Agent, or Firm* — Volpe and Koenig, P.C.

(57) ABSTRACT

An exhaust-gas conduction component that is effective as a vibration decoupling element and can be installed in an exhaust-gas system for conducting the exhaust gases of a motor vehicle internal combustion engine. The exhaust-gas conduction component (1) has an outer pipe (2) with a corrugated metal tube section (3; 4) and an inner pipe (8) that is coaxial with the outer pipe (2) and separated from the latter by an annular gap. The outer pipe (2) also has a smooth central section (5), first and second corrugated metal tube sections (3; 4) and smooth first and second end sections (6; 7). The inner pipe (8) is permanently fixed to the outer pipe (2) by a continuous joint (9) extending around the central section (5) and the rectilinear exhaust-gas conduction component (1) is approximately axially symmetrical in relation to a central transverse axis (10). The exhaust-gas conduction component is especially suitable in utility vehicles for linking an emission control unit to an internal combustion engine.

10 Claims, 2 Drawing Sheets

EXHAUST-GAS CONDUCTION COMPONENT

BACKGROUND

The invention relates to an exhaust-gas conduction component that is effective as a vibration-decoupling element.

From DE 196 04 367 A1 it is known to use an exhaust-gas conduction component that is isolated by an air gap for decoupling vibration in a motor-vehicle exhaust-gas system, wherein, for this exhaust-gas conduction component, the outer pipe has a corrugated pipe section. Through the construction with an inner pipe extending coaxial to the outer pipe, heat losses are kept low, which improves the cold-start behavior of a downstream catalytic converter.

The service life represents one problem in such components. At contact points between the inner pipe and outer pipe or between the decoupling element and connected exhaust-gas conduction pars or components, fatigue fractures or other undesired wear phenomena can appear.

SUMMARY

The objective of the invention is to provide an exhaust-gas conduction component that is effective as a vibration decoupling element and that has a long service life.

This objective is met by an exhaust-gas conduction component according to the invention.

According to the invention, the exhaust-gas conduction component has a middle section with a smooth construction and first and second corrugated pipe sections, as well as, in addition, respective first and second end sections with smooth constructions. The inner pipe is connected to the outer pipe rigidly by a peripheral joint in a region of the middle section at least in some points. The straight-line exhaust-gas conduction component here has, according to the invention, an at least approximately axis-symmetric construction with respect to its middle transverse axis. The exhaust-gas conduction component thus provides two halves with approximately equal constructions each with a section constructed as a corrugated pipe. The corrugated pipe sections have approximately the same length and the same natural vibration response and act similarly as expansion equalizers and vibration decouplers.

For this construction, considerable production advantages are obtained relative to a construction with a single decoupling region with double length, especially with respect to the tool dimensions required for shaping the corrugated pipe sections. Furthermore, an improved natural vibration response is produced. Each of the two corrugated pipe sections connected to each other by the rigid middle section is designed, in particular, with a short construction, so that its resonance frequency lies above the typical vibration excitation from the internal combustion engine. On the other hand, it is possible to construct the exhaust-gas conduction component overall, in particular, to design it with a low frequency with respect to its natural frequency behavior so that incoming oscillation energy is effectively absorbed. The construction according to the invention allows a tuning of the oscillation behavior as would be barely possible for a component of equal length and with only one corrugated pipe section. Due to the annular air gap present at least approximately across the entire component length between the inner pipe and outer pipe, rubbing of the inner pipe and the outer pipe and thus friction wear are avoided. Due to the typically small mechanical attachment surface of the inner pipe on the rigid middle section of the outer pipe by the joint, a mutual vibration stimulation is low. Nevertheless, the mass contribution of the inner pipe favorably influences the natural vibration response of the entire component. Furthermore, due to the low, advantageously annular contact surface between the inner pipe and outer pipe, thermal transfer is reduced and thus the isolation behavior of the exhaust-gas conduction component is further improved.

In the construction of the invention, the first corrugated pipe section and/or the second corrugated pipe section are constructed as wound pipes with a corrugated profile. This embodiment allows, to a certain extent, an axial parallel offset of the outer pipe parts connecting to the middle section on both sides. Preferably, the corrugated pipe sections are each constructed as wound, folded pipes, which allows a certain curvature, twisting, or axial movement.

In a preferred additional construction of the invention, the first corrugate pipe section and the second corrugated pipe section have an opposite-sense wound construction. This increases the torsional play.

In an additional construction of the invention, the middle section has a dimensionally stable construction. This imparts the necessary mechanical stability to the outer pipe.

In an additional construction of the invention, the inner pipe is constructed as an elastic metal pipe that is flexible in the longitudinal direction and that is rigidly connected to the outer pipe by a peripheral joint in the end region of the end sections at least in some points and is arranged free from contact with the outer pipe with the exception of the connections to the outer pipe provided at the joints. Thus there is a rigid connection of the inner pipe with the outer pipe at the ends and in the middle of the outer pipe, with this connection extending across a peripheral line of the inner pipe. In the conduction sections located between the attachment points there is a continuous air gap between the inner pipe and the outer pipe. The through-flow capacity of the air gap is prevented to a large extent or completely due to the peripheral joints. In this way, an especially effective heat isolation is produced. Due to the elastic construction of the inner pipe flexible in the longitudinal direction, this pipe can follow vibrational expansions of the outer pipe and stresses between the inner pipe and outer pipe are avoided. On the other hand, the inner pipe is not exposed to strong mechanical loads, because the exhaust-gas conduction component is connected to the connected components by the end sections of the outer pipe constructed advantageously as welded nozzles. Advantageously, the inner pipe is constructed as a wound, folded pipe or as an Agraff tube.

In an additional construction of the invention, the inner pipe has a dimensionally stable and smooth construction and is arranged free from contact with the outer pipe across the predominant part of its longitudinal extent. It is advantageously provided that the inner pipe is connected rigidly to the outer pipe merely in the region of the middle section. Vibrations excited from the outer pipe to the inner pipe are therefore reduced. A slide seat or a similar connection that allows a relative movement between the outer pipe and the inner pipe can be provided on the end sections. Thus, for the inner pipe, an at least approximately friction-free movement play is given relative to the outer pipe. Therefore, mechanical stresses between the outer pipe and inner pipe are prevented. Due to its dimensionally stable or rigid construction, no or only negligible internal friction occurs during thermal expansions or vibrational excitation. The mechanical loading of the inner pipe is therefore greatly reduced and the service life is increased accordingly. Due to the air gap provided over nearly the entire longitudinal extent, good thermal isolation is guaranteed.

In an additional construction of the invention, the inner pipe has an integral construction. Due to the elimination of fixed joints within the inner pipe, the wear resistance and the service life are further improved.

In an additional construction of the invention, the outer pipe is constructed in one piece or two pieces with a detachable separation point running in the region of the middle transverse axis. A one-piece construction of the outer pipe improves the wear resistance and the service life. However, production difficulties are produced starting at a certain length. For longer constructions, therefore, a two-part construction is provided, wherein the two parts are connected to each other rigidly in the middle section, for example, by a band connection, advantageously in a sealing embodiment.

In an additional advantageous embodiment, it is provided that the joint is constructed as an essentially continuous welded seam. For a good strength of the joint between the inner pipe and the outer pipe, a welded seam running continuously and unbroken along a peripheral line of the inner pipe is advantageous. However, a plurality of spot welds lined up with each other along a peripheral line could also be provided. According to the embodiment of the inner pipe, these are provided only in the region of the middle section or, in addition, at the ends on the end sections.

In an additional advantageous embodiment, the exhaust-gas conduction component has a positive-fit and/or non-positive-fit connection realized at the joint by a clinching technique, a shearing and upsetting technique, a rivet technique, or according to the wobble pressing method. These joining techniques could be identified as especially durable. In comparison with a weld connection, production advantages could be realized and improved results could be achieved with respect to reliability. According to the embodiment of the inner pipe, the joints constructed in this way are provided only in the region of the middle section or, in addition, at the ends on the end sections.

In an especially advantageous embodiment, the exhaust-gas conduction component has a resonance frequency lying outside of a range from 30 Hz to 100 Hz relative to mechanically stimulated vibrations. This design has proven to be especially durable. Engine vibrations of higher order occurring in this frequency range in the vibration spectrum are effectively damped and an especially effective vibration decoupling is given. Advantageously, the exhaust-gas is constructed and tuned so that its natural frequencies or resonance points lie above the oscillation range from 30 Hz to 100 Hz.

BRIEF DESCRIPTION OF THE DRAWINGS

Advantageous embodiments of the invention are illustrated in the drawings and are described below. Here, the features mentioned above and those still to be explained below can be used not only in the specified feature combinations, but also in other combinations or by themselves, without leaving the scope of the present invention.

Shown are.

DETAILED DESCRIPTION OF THE PREFERRED EMBODIMENTS

Figure 1:
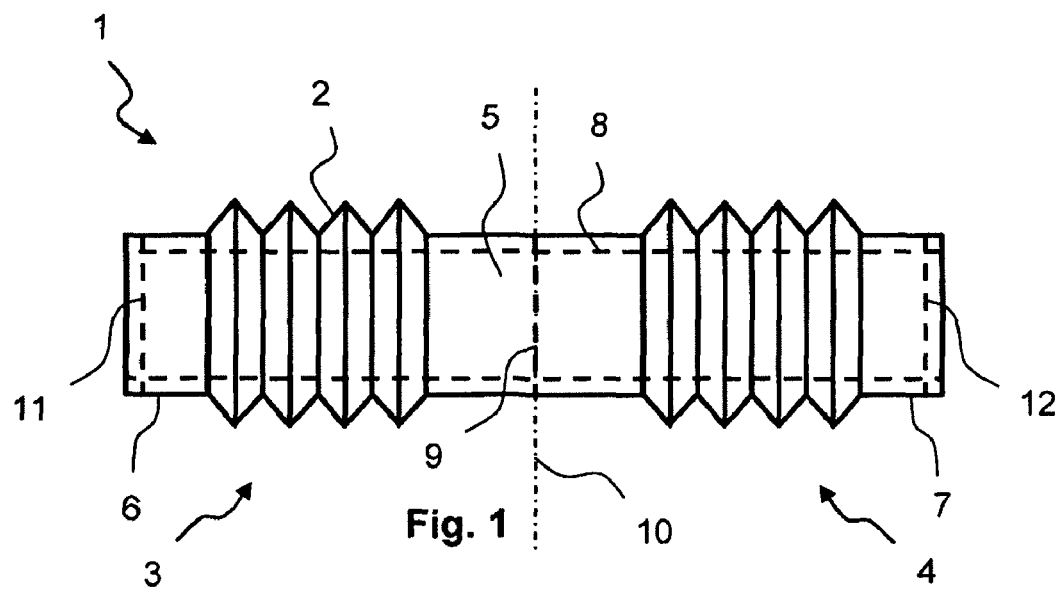
FIG. 1 a first advantageous embodiment of the exhaust-gas conduction component according to the invention, FIG. 2 a second advantageous embodiment of the exhaust-gas conduction component according to the invention, and FIGS. 3a-3c advantageous embodiments of a joint for fixed connection of the outer pipe and inner pipe of an exhaust-gas conduction component according to FIG. 1 and FIG. 2.

The exhaust-gas conduction component shown schematically in FIG. 1 is provided for use as a vibration-decoupling element in the exhaust-gas system for conducting the exhaust gases of a motor-vehicle internal combustion engine, in particular, a utility vehicle. Preferably, it is used as a pipe connection element between the turbine of an exhaust-gas turbocharger and a housing of an exhaust-gas after-treatment device. Through the use of the exhaust-gas conduction component 1 according to the invention and described in detail below, a transmission of mechanical vibrations going out from the advantageously spring-mounted internal combustion engine to the exhaust-gas after-treatment device connected advantageously rigidly to a car body is avoided.

The exhaust-gas conduction component 1 has a symmetric construction with respect to a middle transverse axis 10 with an outer pipe 2 and an inner pipe 8 each with circular cross sections. The outer pipe 2 has a first end section 6, a second end section 7, and a middle section 5 that each have smooth and rigid pipe section constructions. The end sections 6, 7 are used here as weld pieces for connecting to the component connected in front or behind. End flanges could likewise be provided for the connection. For equalizing elongation and for absorbing or decoupling vibrations, a first corrugated pipe section 3 and a second corrugated pipe section 4 are provided that advantageously have the same construction and that are arranged symmetric to the middle transverse axis 10 between the middle section 5 and the corresponding end section 6, 7.

The outer pipe 2 preferably has a gas-tight or at least approximately gas-tight construction with low leakage rates. In particular, it is provided advantageously to construct at least the middle section 5 as a pipe piece based on a material with microscopically closed material composite.

The corrugated pipe sections 3, 4 impart elasticity to the outer pipe 2 at least in the axial direction, wherein this allows vibration movements to be equalized. If the corrugated pipe sections 3, 4 are constructed as wound pipes with corrugated profiles, then the outer pipe can be wound, which also allows torsion movements or vibrations to be equalized. In particular, in a preferred construction of the corrugated pipe sections 3, 4, an axial parallel offset of assemblies connected to the exhaust-gas conduction component 1 is also enabled. The corrugated pipe sections 3, 4 could also be constructed, however, from a pipe material with a microscopically closed material composite. In this way, a completely gas-tight construction of the outer pipe 2 is achieved.

In order to account for the demand for low heat losses, the exhaust-gas conduction component is constructed as a double line isolated with an air gap with an outer pipe 2 and an inner pipe 8. The inner pipe 8 extends across the entire length of the exhaust-gas conduction component 1, wherein the inner pipe 8 ends approximately flush with the outer pipe 2 at the corresponding end section 6, 7. Apart from the joints 9, 11, 12, the inner pipe 8 does not contact the outer pipe and is arranged with an annular gap coaxial to the outer pipe 2. At the joints 9, 11, 12, the inner pipe 8 is connected rigidly to the outer pipe 2 along a peripheral line. Here, one joint 9 is provided approximately in the center and two additional joints 11, 12 are provided at each end. The joints are constructed, for example, as uninterrupted, peripheral weld seams. However, other types of joining technology could also be used, which will be discussed in detail farther below. Due to the described embodiment, in each half of the exhaust-gas conduction component 1 there is an annular air gap that is continuous from each end region up to the middle and this air gap prevents, to a large degree, heat transfer from the interior of the exhaust-gas conduction component 1 to the outer pipe 2 and thus heat dissipation to the surroundings. Because there is only a small contact zone between the inner pipe 8 and the outer pipe 2 at the joints 9, 11, 12 in comparison with the total dimensions, the heat losses due to heat dissipation to the outer pipe 2 are also low.

In order to be able to follow expansion, vibration, or bending movements of the outer pipe 2, the inner pipe 8 is constructed as an elastic pipe component that is flexible with respect to axial length changes. Especially preferred is a construction as a wound, folded pipe or as a so-called Agraff pipe.

With the described embodiment according to FIG. 1, a vibration-decoupling element with long service life is obtained. In particular, due to the greatest possible decoupling of the inner pipe 8 from the outer pipe 2, a long service life with runtimes covering several hundred thousand kilometers can be achieved. In many applications, however, the service life is limited by internal friction of the inner pipe 8. This friction is generated due to length changes that are parallel to the outer pipe 2 and that cause winding positions of the inner pipe 8 constructed as a wound or agrafe pipe to rub against each other. With the embodiment explained below with reference to FIG. 2, these disadvantages can be prevented and the service life can be further improved.

Figure 2:
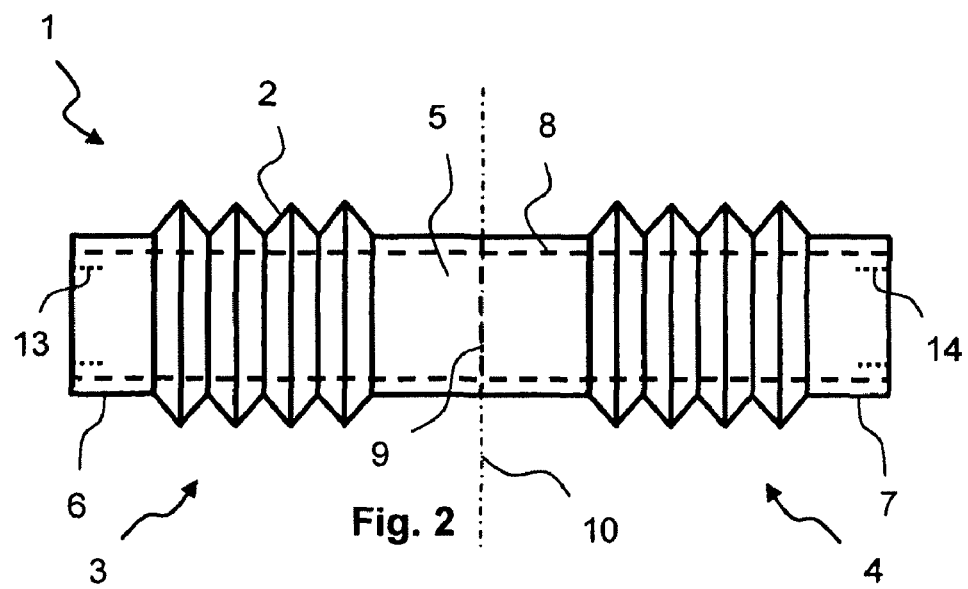

FIG. 2 shows a preferred embodiment of an exhaust-gas conduction component 1 that is effective as a vibration-decoupling element and that is constructed analogous to the exhaust-gas conduction component shown in FIG. 1 with respect to properties of symmetry and the construction of the outer pipe 2. The essential differences will be discussed below.

In particular, the inner pipe 8 of the exhaust-gas conduction component according to FIG. 2 is constructed as a rigid, dimensionally stable, and smooth pipe piece. As the attachment of the inner pipe 8 to the outer pipe 2, only one joint is provided in the middle section 5. This can be constructed analogous to the joints noted in connection with FIG. 1. A direct contact between the inner pipe 8 and the outer pipe 2 is otherwise not provided. Thus, an air gap isolation extending across practically the entire component length is also produced. A guide or support or seal constructed as a sliding-fit seat 13, 14 or with a similar shape at the ends of the exhaust-gas conduction component 1 allows an at least approximately friction-free axial relative movement of the inner pipe 8 relative to the outer pipe 2.

With respect to the vibration behavior of the exhaust-gas conduction component 1, the inner pipe 8 corresponding to the construction according to FIG. 2 acts mainly as a passive vibration damper. This leads to an especially effective damping or decoupling of vibrations transmitted to the exhaust-gas conduction component 1. By setting the mass of the inner pipe in relation to the mass of the outer pipe 2 and the spring and damping properties of the corrugated pipe sections 3, 4, a total adjustment can be achieved that has especially favorable properties with respect to the predominant conditions. Here, it has proven especially advantageous to provide overall tuning in which resonant excitation in the range from approximately 30 Hz to approximately 100 Hz is avoided. It is understood that this is possible to the same degree also for the embodiment shown in FIG. 1.

Tuning of the natural oscillation behavior or the resonance behavior can also be achieved advantageously by dimensioning of the corrugated pipe sections 3, 4, in particular, by their lengths. Tuning is also possible, however, by dimensioning the corrugations. For example, a smaller amplitude of the corrugations could be provided in the edge regions of the corrugated pipe sections 3, 4 than in the middle regions and/or a wavelength that is variable across the length of a corrugated pipe section 3, 4 could also be provided. In this way, through a simple and small change to the construction or the manufacturing conditions, an adaptation to different initial conditions with respect to the vibration situation can be achieved.

With a view toward the manufacturing expense, it can be advantageous to construct, in particular, the outer pipe 2 not in one piece, but instead in two pieces. The connection point preferably lies on or in the immediate vicinity of the middle transverse axis 10 of the overall component 1. For both halves, equal components could then be used. A detachable connection of the two halves, for example, by a pipe clamp or a weld connection could be provided.

An especially long service life could be achieved for the exhaust-gas purification component according to FIG. 1 or FIG. 2 if the joints 9, 11, 12 are produced under the use of certain mechanical joining methods. Therefore, weld connections that are often critical with respect to service life can be eliminated. Advantageous joining methods are explained below with reference to FIGS. 3a to 3c.

Figure 3A:
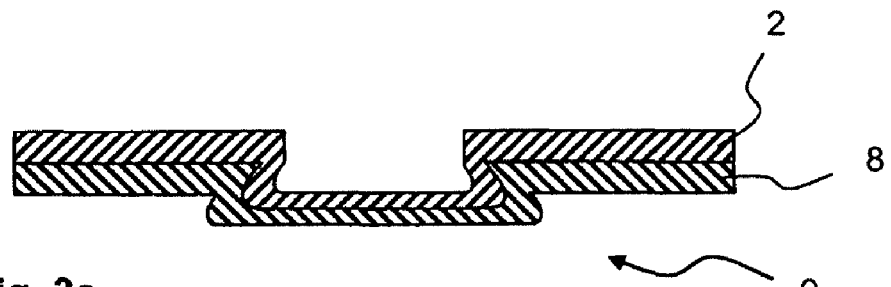

A connection of the outer pipe 2 and inner pipe 8 at the joints 9, 11, 12 provided for this purpose in the form of a clinched connection as shown schematically in FIG. 3a is especially durable. Through the effect of a pressing force of a suitable tool, a joint deformation of the sheet metal of the outer pipe 2 and inner pipe 8 is realized such that a bulging of the outer pipe 2 with a cap-shaped cross section is produced in a corresponding profile of the inner pipe 8. The resulting clinched connection is gas-tight and extremely resistant to continuous vibration loading. The clinched connection can be constructed as an uninterrupted connection line or in the shape of point connections along a peripheral line of the outer pipe 2 or inner pipe 8.

Figure 3B:
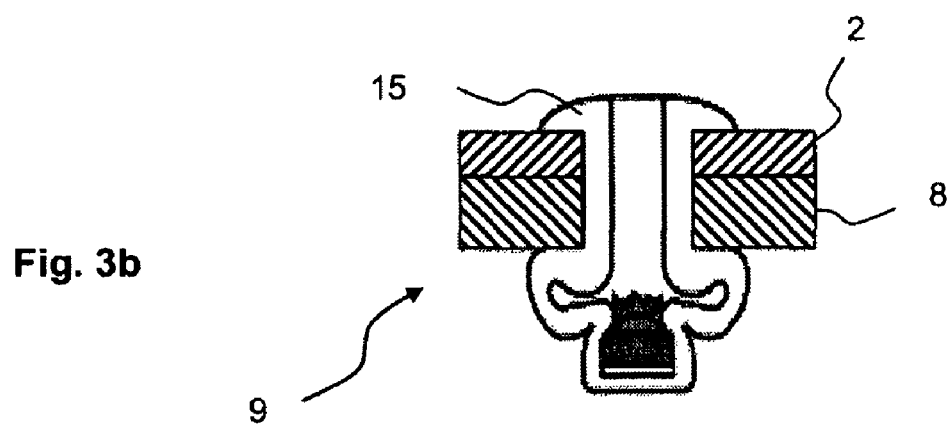

A fixed and durable joint could also be achieved by a connection shown in FIG. 3b using blind rivets 15, wherein, in particular, gas-tight types could be used. Several, advantageously more than three rivet connections on a peripheral line form a joint 9, 11, 12 between the outer pipe 2 and inner pipe 8.

Figure 3C:
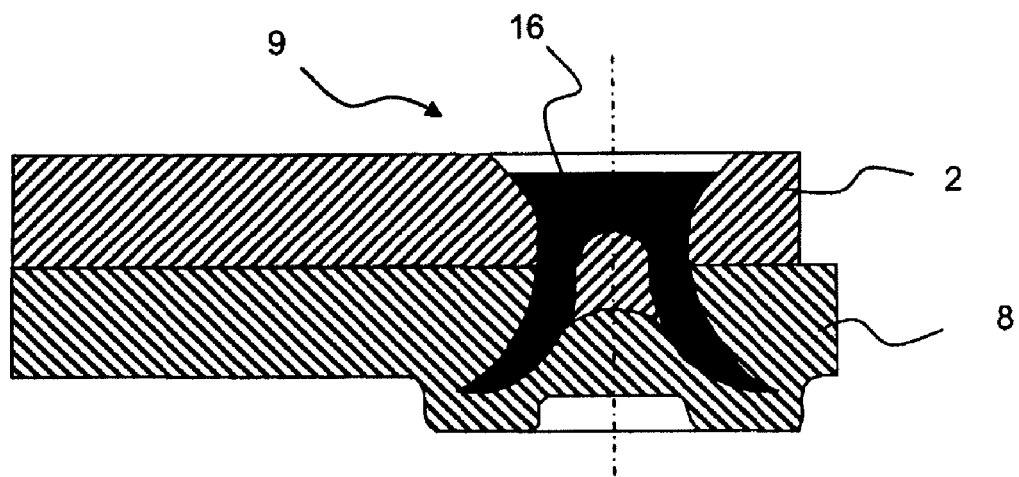

An additional advantageous embodiment of a joint is the connection shown in FIG. 3c by punch rivets 16. Here, several, advantageously more than three rivet connections are likewise provided along a peripheral line.

As additional, advantageous connection techniques not explained in more detail for the production of a joint 9, 11, 13 for the exhaust-gas conduction component 1 according to the invention include riveting methods using solid rivets or shaping methods according to the wobble-pressing principle. The mentioned connection techniques that can be used as alternatives to the weld connection technique have the advantage of allowing a more reliable connection to be produced by cold working, wherein a cost advantage for the production can also be realized.

The invention claimed is:

1. Exhaust-gas conduction component (1) that is effective as a vibration-decoupling element for installation in an exhaust-gas system for conducting the exhaust gases of a motor-vehicle internal combustion engine, comprising an outer pipe (2) and an inner pipe (8) that is arranged coaxial to the outer pipe (2) and that is separated from the outer pipe by an annular gap, the outer pipe (2) comprising
   a middle section (5) with a smooth construction,
   a first corrugated pipe section (3) and a second corrugated pipe section (4) located on the opposite sides of the middle section, and,
   a first end section (6) and a second end section (7) each with a smooth construction,
the inner pipe (8) is connected rigidly to the outer pipe (2) at least in some spots by a middle peripheral joint (9) in a region of the middle section (5), wherein the exhaust-gas conduction component (1) has a straight-line construction and has an at least approximately axis-symmetric construction with respect to a middle transverse axis (10), and the inner pipe (8) has a dimensionally stable and smooth construction and is arranged without contact with the outer pipe (2) over a predominant part of its longitudinal extent.

2. Exhaust-gas conduction component (1) that is effective as a vibration-decoupling element for installation in an exhaust-gas system for conducting the exhaust gases of a motor-vehicle internal combustion engine, comprising an outer pipe (2) and an inner pipe (8) that is arranged coaxial to the outer pipe (2) and that is separated from the outer pipe by an annular gap, the outer pipe (2) comprising a middle section (5) with a smooth construction, a first corrugated pipe section (3) and a second corrugated pipe section (4) located on the opposite sides of the middle section, and, a first end section (6) and a second end section (7) each with a smooth construction, the inner pipe (8) is connected rigidly to the outer pipe (2) at least in some spots by a middle peripheral joint (9) in a region of the middle section (5), wherein the exhaust-gas conduction component (1) has a straight-line construction and has an at least approximately axis-symmetric construction with respect to a middle transverse axis (10), and at least one of the first corrugated pipe section (3) or the second corrugated pipe section (4) are constructed as wound pipes with corrugated profiles.

3. Exhaust-gas conduction component according to claim 2, wherein the first corrugated pipe section (3) and the second corrugated pipe section (4) have constructions wound in an opposite sense.

4. Exhaust-gas conduction component according to claim 1, wherein the middle section (5) has a dimensionally stable construction.

5. Exhaust-gas conduction component (1) that is effective as a vibration-decoupling element for installation in an exhaust-gas system for conducting the exhaust gases of a motor-vehicle internal combustion engine, comprising an outer pipe (2) and an inner pipe (8) that is arranged coaxial to the outer pipe (2) and that is separated from the outer pipe by an annular gap, the outer pipe (2) comprising a middle section (5) with a smooth construction, a first corrugated pipe section (3) and a second corrugated pipe section (4) located on the opposite sides of the middle section, and, a first end section (6) and a second end section (7) each with a smooth construction, the inner pipe (8) is connected rigidly to the outer pipe (2) at least in some spots by a middle peripheral joint (9) in a region of the middle section (5), wherein the exhaust-gas conduction component (1) has a straight-line construction and has an at least approximately axis-symmetric construction with respect to a middle transverse axis (10), and the inner pipe (8) is constructed as an elastic metal pipe that is flexible in a longitudinal direction and that is connected rigidly to the outer pipe (2) at least in some spots by end peripheral joints (11; 12) in end regions of the end sections (6, 7) and extends between the end sections and is arranged without contact with the outer pipe (2) except for the connections to the outer pipe (2) provided at the middle and end peripheral joints (9; 11; 12).

6. Exhaust-gas conduction component according to claim 1, wherein the inner pipe (8) has a one-piece construction.

7. Exhaust-gas conduction component according to claim 1, wherein the outer pipe (2) has a one-piece or two-piece construction with a detachable separation point extending in a region of the middle transverse axis (10).

8. Exhaust-gas conduction component according to claim 5, wherein the middle and end peripheral joints (9; 11; 12) have an essentially continuous welded seam construction.

9. Exhaust-gas conduction component according to claim 5, wherein the joints (9; 11; 12) have a positive or non-positive fit connection formed by clinching, shearing and upsetting, riveting or wobble-pressing of material of the inner and outer pipes.

10. Exhaust-gas conduction component according to claim 1, wherein the exhaust-gas conduction component has a resonance frequency lying outside of a range from 30 Hz to 100 Hz relative to mechanically stimulated vibrations.

* * * * *